Figure 3:
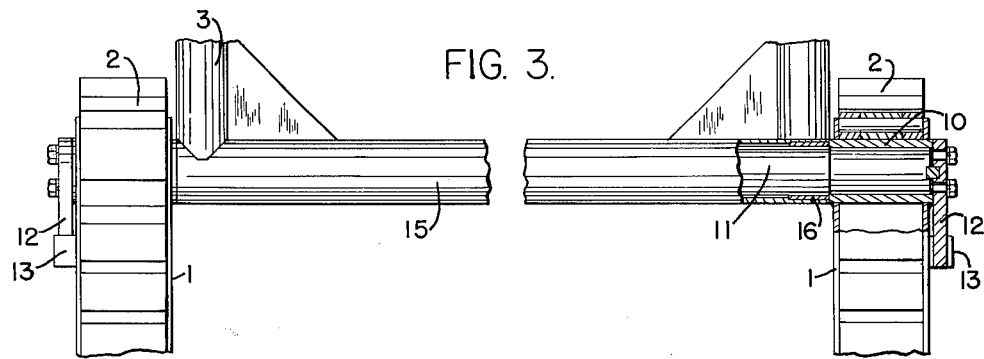

July 24, 1962   J. C. CURTIS   3,045,771
CRAWLER WITH INDEPENDENTLY TILTABLE TREAD FRAMES
Filed April 9, 1959   2 Sheets-Sheet 1
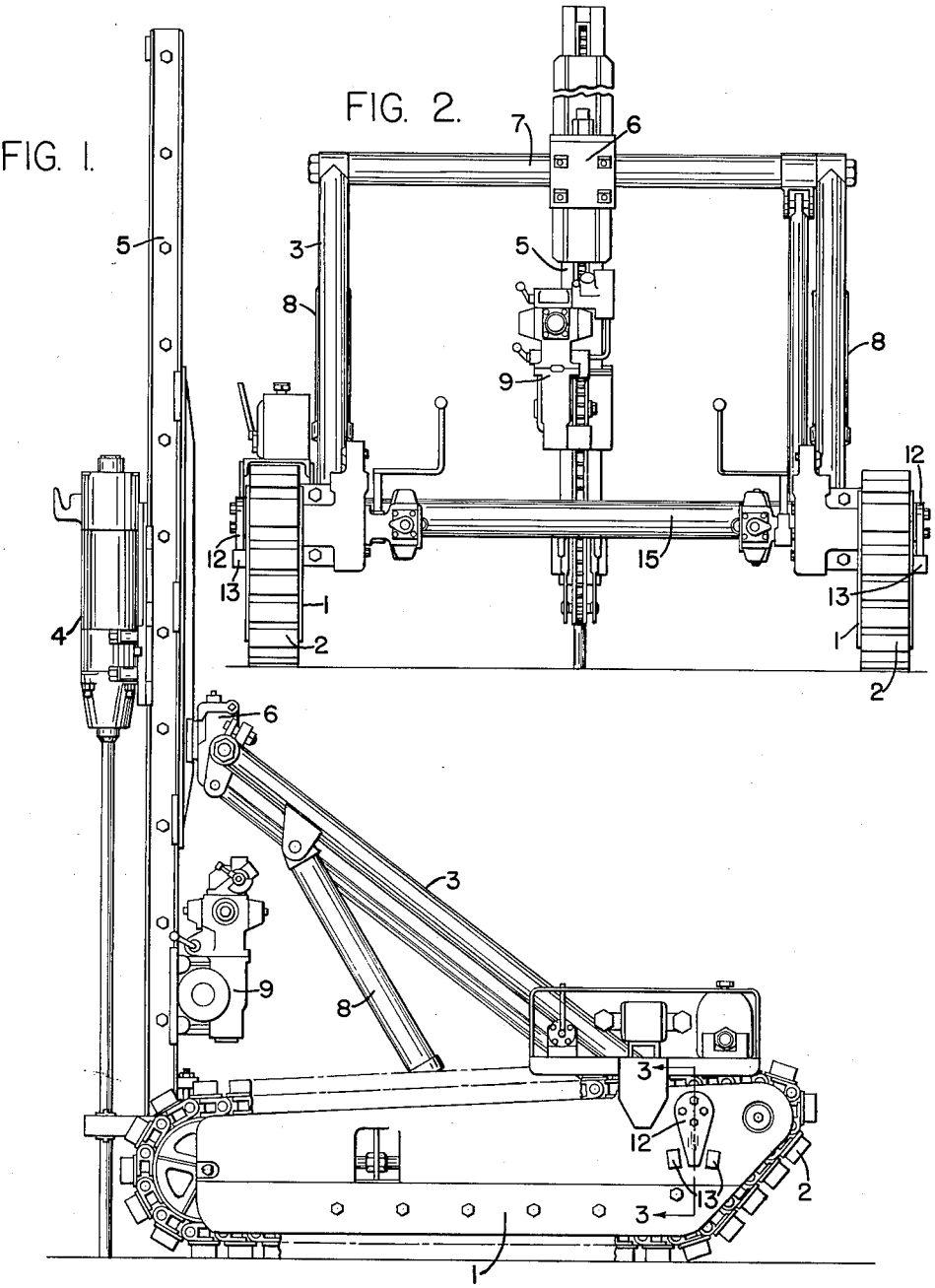
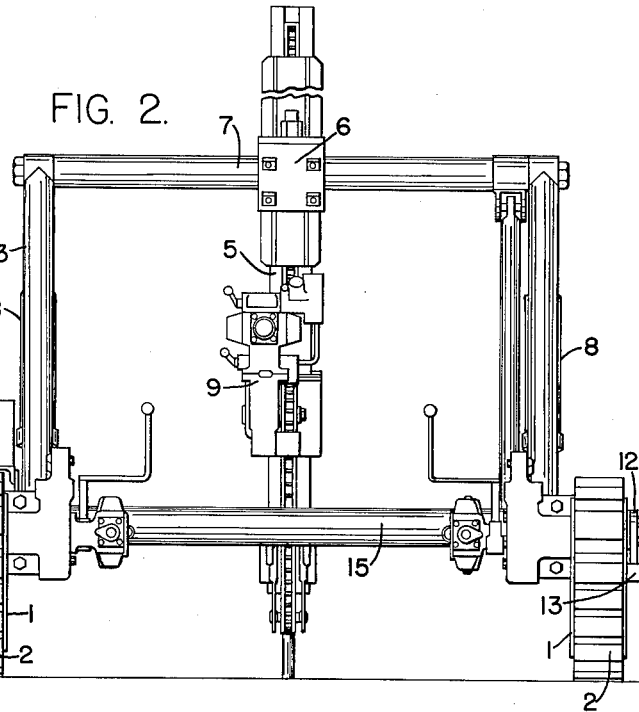
INVENTOR.
JOHN C. CURTIS
BY
ATTORNEY July 24, 1962     J. C. CURTIS     3,045,771
CRAWLER WITH INDEPENDENTLY TILTABLE TREAD FRAMES Filed April 9, 1959     2 Sheets-Sheet 2

*INVENTOR.*
JOHN C. CURTIS
BY
ATTORNEY

United States Patent Office 3,045,771
Patented July 24, 1962

3,045,771
CRAWLER WITH INDEPENDENTLY TILTABLE TREAD FRAMES
John C. Curtis, Newport, N.H., assignor to Joy Manufacturing Company, Pittsburgh, Pa., a corporation of Pennsylvania
Filed Apr. 9, 1959, Ser. No. 805,297
3 Claims. (Cl. 180—9.5)

This invention relates to crawler type propelling means and more particularly to a crawler mounting for rock drills for supporting and propelling the latter over an uneven terrain.

Usually in crawler mounted rock drill rigs the crawler tread devices are mounted for independent tilting movement in vertical planes to enable the crawler mounting to traverse an uneven terrain and power devices are provided for locking the tread frames and drill support firmly in position to hold the same against relative movement during the drilling operation thereby to provide an extremely stable drill mounting. It has been found in such crawler tread mountings that the tread devices due to their relatively unlimited freedom to tilt may swing down too low or up too high thereby to a substantial extent decreasing the stability of the apparatus. The present invention contemplates improvements over such known types of rock drill mountings in that improved means is provided for limiting the range of tilt of the crawler tread devices, and embodying improved means for supporting the adjustable support for the rock drill. In this novel construction the tilt limiting means for the crawler tread devices includes a cross connecting member extending between and mounted on the tread side frames and providing a transverse support on which the drill supporting boom is swingably mounted.

An object of the present invention is to provide an improved crawler tread mechanism. Another object is to provide an improved crawler tread mechanism having independently tiltable tread frames and improved means cooperating with the tread frames for limiting the relative tilting movement thereof. Yet another object is to provide an improved means for limiting the relative tilting movement of crawler tread devices comprising a cross connecting member extending between and engaging said tread frames. A further object is to provide an improved tilt limiting means for relatively tiltable tread frames of a crawler mounted rock drill including a cross connecting member on which the drill supporting boom is pivotally mounted. These and other objects and advantages of the invention will, however, hereinafter more fully appear.

In the accompanying drawings there are shown for purposes of illustration one preferred form and a modification thereof which the invention may assume in practice.

Figure 4:
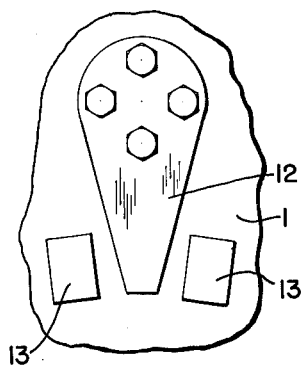
Figure 5:
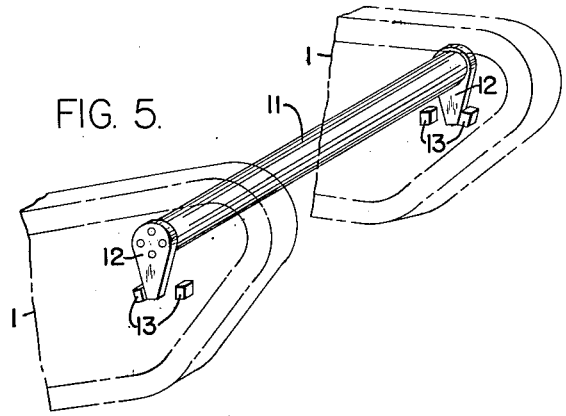
Figure 6:
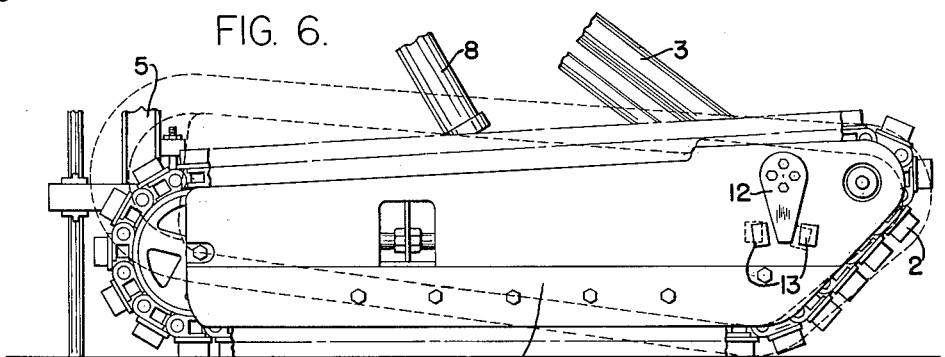
Figure 7:
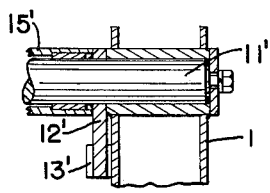

In these drawings:
FIG. 1 is a side elevational view of a crawler mounted rock drill in which a preferred illustrative form of the invention is embodied.
FIG. 2 is an end elevational view of the rock drill shown in FIG. 1.
FIG. 3 is an enlarged fragmentary cross section taken on line 3—3 of FIG. 1.
FIG. 4 is an enlarged detail end view showing one of the lever arms and the cooperating stop lugs of the improved tilt limiting means.
FIG. 5 is a schematic perspective view showing the tread frames tilted in relatively opposite directions.
FIG. 6 is a detail side view of one of the crawler tread devices with a tilted position indicated in dotted lines, and showing a portion of the tilt limiting means.
FIG. 7 is a detail section taken on the plane of FIG. 3, showing a modified construction.

The rock drill rig in which the present invention is embodied comprises a crawler base having independently tiltable side frames 1 about the margins of which endless crawler treads or tread chains 2 are guided for orbital circulation. The crawler base may assume various known forms but is herein generally like that disclosed in the Barton and Curtis Patent No. 2,845,251, dated July 29, 1958, and owned by the same assignee as the present invention. The crawler treads, as disclosed in this patent, may be motor driven and controlled for propelling and steering the rock drill rig.

An adjustable drill support 3 carries a conventional hammer rock drill 4 mounted for guided movement along an elongated drill guide frame 5 adjustably secured as by a saddle clamp 6 to the outer end of the drill support 3. This drill support 3 is desirably in the form of a swingable boom and for illustrative purposes is of inverted U-shape with the legs of the U pivotally mounted on the crawler base and the saddle clamp engaging the transverse outer connecting portion 7 of the U-frame. Extensible jack devices 8, herein desirably cylinder and piston type fluid jacks, are pivotally connected by the inner sides of the crawler tread frames and the legs of the U-shaped boom frame for swinging the boom frame in a vertical plane about its pivot and for locking the tread frames in their relatively tilted positions. A motor 9 on the drill guide frame serves to drive conventional feeding means for feeding the rock drill back and forth along the guide frame as disclosed in the Curtis Patent No. 2,338,625, dated January 4, 1944, also owned by the assignee of the present invention. Evidently the invention may be embodied in crawler base mountings of other types for limiting the relative tilting movement of the crawler tread devices.

Now referring to the improved means for limiting the relative tilting movement of the crawler tread frames it will be noted that extending horizontally between and journaled in bearings 10 on the tread frames is a cross connecting member 11 herein desirably in the form of a cylindrical cross bar. Secured to the ends of this cross connecting member or cross bar are depending lever arms 12 desirably located at the outer sides of the tread frames, as shown most clearly in FIGS. 3 and 6. Spaced stop lugs 13 are secured to the outer sides of the tread frames at the opposite sides of the lever arms with a lever arm extending down between a pair of lugs, for limiting relative swinging movement between the tread frames and lever arms. Thus when one of the tread frames tilts downwardly and the other tread frame tilts upwardly as shown schematically in FIG. 5, the range of tilt is limited by the engagement of the lugs on the tread frames with the lever arms so that the cross connecting member cooperating with the lever arms and lugs ties one tread frame with the other thereby to serve as a tilt limiting element between the frames. Also these lever arms and lugs and the cross connecting member cooperate to limit tilt of either tread frame in either direction relative to the other thus preventing over-tilting of either tread frame.

In this preferred construction the U-shaped boom frame which supports the rock drill has its legs secured at their inner ends to a transverse tubular member 15 coaxial with and surrounding the cross connecting member 11, and this tubular member is journaled on bearings 16 supported by the cross connecting member, as shown in FIG. 3. Thus the drill supporting boom may swing freely in a vertical plane relative to the cross connecting member 11 while supported thereby.

In the modified construction shown in FIG. 7 the lever arms 12' secured to the cross connecting member 11' are located at the inner sides of the tread frames and these lever arms cooperate with spaced lugs 13' secured at the inner sides of the tread frames. The lever arms are arranged at the ends of the tubular drill boom support 15' which are, in this instance, spaced inwardly from the inner sides of the tread frames to provide clearance spaces for the lever arms, as shown.

As a result of this invention an improved crawler base is provided having independently tiltable crawler tread devices and improved means for limiting the relative tilting movement of the crawler tread devices. By the provision of the cross connecting member extending between and engaging the tiltable tread frames of the crawler tread devices together with the cooperating stop means on the tread frames tilting of the tread frames in opposite directions is positively limited thus preventing the tread frames from tilting too far either upwardly or downwardly. The cross connecting member of the tilt limiting means for the tread frames provides a relatively simple and stable support for the swingable drill supporting boom. By the provision of the improved tilt limiting means associated with the crawler base an extremely stable base structure is provided. Other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. A crawler propelled support comprising, laterally spaced crawler frames having crawler treads mounted for circulation about the margins thereof respectively, bearing means located on respective portions of and extending through said frames, an elongated laterally extending shaft extending through said bearings with the ends thereof terminating closely adjacent the outer lateral surface respectively of said crawler frames for permitting independent pivotal movement of said crawler frames about the axis of and relative to said shaft, lever means rigidly secured to the ends of said shaft respectively and extending radially of the axis thereof, stop means rigidly secured to the outer lateral surface respectively of said crawler frames and located to be abuttingly engaged by said lever means for limiting pivotal movement of said crawler frames about said shaft, whereby movement of said support over an uneven surface causes independent limited pivotal movement of said crawler frames upon engagement of said lever means with said stop means.

2. A crawler propelled support comprising, laterally spaced crawler frames having crawler treads mounted for circulation about the margins thereof respectively, bearing means located on respective portions of and extending through said frames and being axially aligned with a laterally extending axis, an elongated laterally extending shaft extending through said bearings for permitting independent pivotal movement of said crawler frames about said shaft, lever means rigidly secured to said shaft and extending radially to the axis thereof, said lever means being secured to said shaft closely adjacent respective sides of sad crawler frames, stop means rigidly secured to said crawler frames and located to be abuttingly engaged by said lever means for limiting pivotal movement of said crawler frames about said shaft, whereby movement of said support over an uneven surface causes independent limited pivotal movement of said crawler frames upon engagement of said lever means with said stop means.

3. A crawler propelled support comprising, laterally spaced crawler frames having crawler treads mounted for circulation about the margins thereof, bearing means located on respective portions of and extending through said frames, an elongated laterally extending shaft extending through said bearings with the ends thereof terminating closely adjacent the outer lateral surface respectively of said crawler frames for permitting independent pivotal movement of said crawler frames about the axis of and relative to said shaft, lever means rigidly secured to said shaft and extending radially to the axis thereof, said lever means being secured to said shaft closely adjacent respective sides of said crawler frames, stop means rigidly secured to said crawler frames and located to be abuttingly engaged by said lever means for limiting pivotal movement of said crawler frames about said shaft, whereby movement of said support over an uneven surface causes independent limited pivotal movement of said crawler frames upon engagement of said lever means with said stop means.

References Cited in the file of this patent

UNITED STATES PATENTS

| | | |
|---|---|---|
| 1,331,088 | Baster | Feb. 17, 1920 |
| 2,428,502 | Pethick | Oct. 7, 1947 |
| 2,534,772 | Howard | Dec. 19, 1950 |
| 2,809,703 | Hayes | Oct. 15, 1957 |
| 2,828,137 | Wagner | Mar. 25, 1958 |
| 2,842,340 | Burress | July 8, 1958 |
| 2,845,251 | Barton et al. | July 29, 1958 |
| 2,940,532 | Lear | June 14, 1960 |